United States Patent
Rostoucher et al.

(10) Patent No.: US 6,543,210 B2
(45) Date of Patent: Apr. 8, 2003

(54) CUTTING MACHINE WITH IMPROVED CUTTING MECHANISM

(75) Inventors: Guy Rostoucher, Belleville sur Vie (FR); Mickael Peterschmitt, Le Perrier (FR); Didier Vallat, La Roche sur Yon (FR)

(73) Assignee: Kuhn - Audureau S.A., La Copechagniere (FR)

( * ) Notice: Subject to any disclaimer, the term of this patent is extended or adjusted under 35 U.S.C. 154(b) by 0 days.

(21) Appl. No.: 09/880,128

(22) Filed: Jun. 14, 2001

(65) Prior Publication Data

US 2001/0052225 A1 Dec. 20, 2001

(30) Foreign Application Priority Data

Jun. 16, 2000 (FR) .............................. 00 07721

(51) Int. Cl.[7] .............................. A01D 49/00
(52) U.S. Cl. .......................... 56/294; 56/505
(58) Field of Search .................. 56/17.5, 294, 296, 56/500, 504, 249, 505, 12.7, DIG. 12; 144/208 J, 4.1; 241/194, 193; 37/301, 302

(56) References Cited

U.S. PATENT DOCUMENTS

| | | | |
|---|---|---|---|
| 3,678,671 A | * 7/1972 | Scarnato et al. | 56/505 |
| 5,003,759 A | 4/1991 | Brown | |
| 5,485,718 A | * 1/1996 | Dallman | 56/294 |
| 5,577,375 A | * 11/1996 | Tillison, Sr. | 56/17.5 |
| 6,000,205 A | 12/1999 | Joray | |
| 6,321,518 B1 | * 11/2001 | O'Hagan | 56/294 |

FOREIGN PATENT DOCUMENTS

| | | |
|---|---|---|
| EP | 0 954 955 A1 | 11/1999 |
| FR | 2 277 624 | 2/1976 |
| GB | 2 307 630 | 6/1997 |

* cited by examiner

*Primary Examiner*—Robert E. Pezzuto
(74) *Attorney, Agent, or Firm*—Oblon, Spivak, McClelland, Maier & Neustadt, P.C.

(57) ABSTRACT

A cutting machine including a frame which can be hitched to a tractor and carries a cutting mechanism including a large cross section rotor equipped with knives which are mounted on axes arranged in pockets provided in the rotor. Each knife is mounted on an individual axis located in a pocket so as to be situated inside the outer periphery of the rotor and wherein this rotor, on at least one side of each pocket, has a concave recess for fitting or removing the corresponding axis.

14 Claims, 3 Drawing Sheets

CUTTING MACHINE WITH IMPROVED CUTTING MECHANISM

BACKGROUND OF THE INVENTION

1. Field of the Invention

The present invention relates to a cutting machine comprising a frame which can be hitched to a tractor and carries a cutting mechanism comprising a large cross section rotor equipped with knives which are mounted on axes arranged in pockets provided in said rotor.

2. Discussion of the Background

Machines of this kind are used in particular for cutting scrub and bushes.

In such a machine which is described in patent application FR 2 277 624, the rotor consists of a tubular hollow profile with openings for the passage of the knives. Inserted elements in the form of pockets are fitted in these openings so as to isolate the inner volume of the rotor from the outside. The knives are mounted on axes which are common to several of them. These axes extend along the entire length of the rotor and pass through the side walls of the pockets. The knives are articulated on the segments of the axes which lie in the pockets, so as to be able to turn about them. Thus, the knives of this rotor can be fully retracted within the limits of the outer contour of the body of the rotor when they encounter stumps or other obstacles, so as to avoid damage to the entire machine under the effect of overload. However, with this rotor, the user may have to completely remove an axis and all the knives mounted on it when one of these knives has to be replaced because of wear. These operations of removing and refitting an axis and the corresponding knives are painstaking or even tiresome if said axis is slightly deformed.

In another machine described in patent FR 2 741 775, the rotor consists of a tube with pockets comprising an end cupel and side walls. The latter extend toward the outside of the tube and carry individual axes for the knives. In this case, the axes and the rear parts of the knives constantly lie outside the outer periphery of the rotor. They are thus exposed to impacts with stumps or other obstacles which may lie on the surface of the ground. These impacts may damage the knives and their axes and even cause the entire machine to deteriorate under the effect of overload.

SUMMARY OF THE INVENTION

The object of the present invention is to propose a cutting machine which does not have the drawbacks of the known machines.

To this end, a significant feature of the invention consists in the fact that each knife is mounted on an individual axis located in a pocket set back toward the inside with respect to the outer periphery of the rotor and in that this rotor, on at least one side of each pocket, has a concave recess for fitting or removing the corresponding axis.

This arrangement makes it possible for each knife to be removed or refitted independently of the adjacent knives. It is thus considerably easier to replace a worn knife. In addition, the rear parts of the knives and their axes of articulation are protected by the wall of the rotor. When a knife encounters an obstacle, it can retract fully. The rotor can thus pass over obstacles without this causing damage to the knives and to their axes or even to the machine in its entirety.

According to another feature of the invention, each axis of articulation for one knife has a means of fixing to a side wall of the corresponding pocket. This means advantageously consists of a shoulder provided at one of the ends of the axis and which has a hole for the passage of a fixing member. The latter may be connected to the side wall of the pocket in such a way as to immobilize the shoulder and the corresponding axis with respect to said pocket.

According to another feature of the invention, a tube of smaller cross section is housed in the rotor. The pockets in which the knives are mounted are advantageously connected to this tube. The latter thus strengthens the assembly and in particular avoids the rotor becoming deformed if it encounters an obstacle.

BRIEF DESCRIPTION OF THE DRAWINGS

Other features and advantages of the invention will become apparent from the description which will follow and which refers to the appended drawings which, by way of nonlimiting examples, depicts several embodiments of the invention.

In these drawings.

DESCRIPTION OF THE PREFERRED EMBODIMENTS

Figure 1:
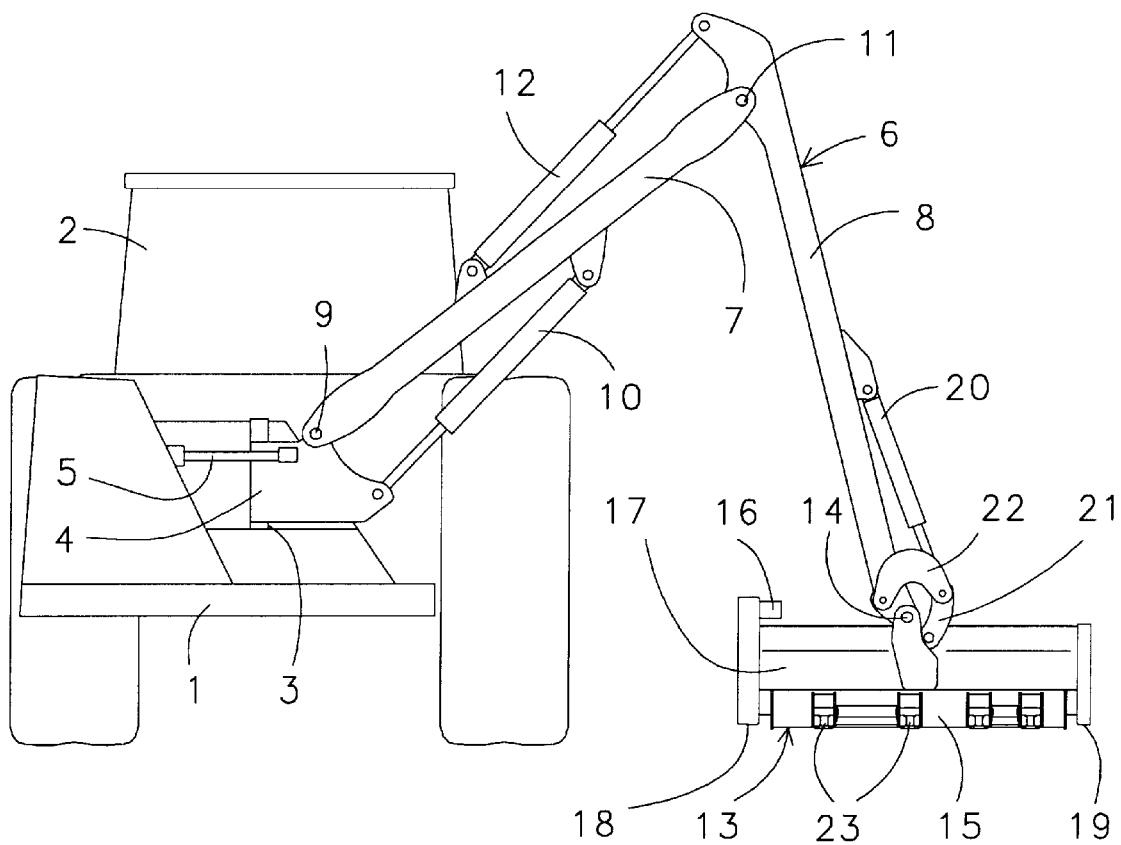
FIG. 1 depicts a rear view of a machine according to the invention in the work position.

As depicted in FIG. 1, the cutting machine according to the invention comprises a frame 1 which can be hitched to the lift device of a tractor 2. The frame 1 has a substantially vertical axis 3 on which a support 4 is articulated. A substantially horizontal hydraulic ram 5 is connected to said support 4 and allows it to be moved about the axis 3. Articulated to this support 4 is a tool holder arm 6 which is made in two parts 7 and 8 in the form of beams and which can be folded one with respect to the other. The inner part 7 is articulated with its lower end to the support 4 by means of a substantially horizontal axis 9. It can be moved about said axis 9 using a first hydraulic ram 10. The outer part 8 of the tool holder arm 6 is articulated to the inner part 7 with a substantially horizontal axis 11. This outer part 8 can be moved about this axis 11 using a second hydraulic ram 12. A cutting mechanism 13 is articulated to the free end of the second part 8 of the arm 6 by means of an axis 14 which is also substantially horizontal. This cutting mechanism 13 is made up in particular of a rotor 15 with large cross section which can be driven in rotation by a hydraulic motor 16. It is partially surrounded by a protective cover 17 which is equipped with lateral skids 18 and 19 which can slide over the ground. Said cutting mechanism 13 can be moved about its axis of articulation 14 using a third hydraulic ram 20. The latter is articulated to the outer part 8 of the arm 6 and to a first lever 21 which is connected to the cutting mechanism 13 and a second lever 22 which is connected to the part 8 of the arm 6. The aforementioned hydraulic rams 5, 10, 12 and 20 are connected to a hydraulic unit which may be located on the machine or on the tractor 2. Their movements are controlled by the operator by means of hydraulic control valves that he can actuate from the tractor 2.

Figure 2:
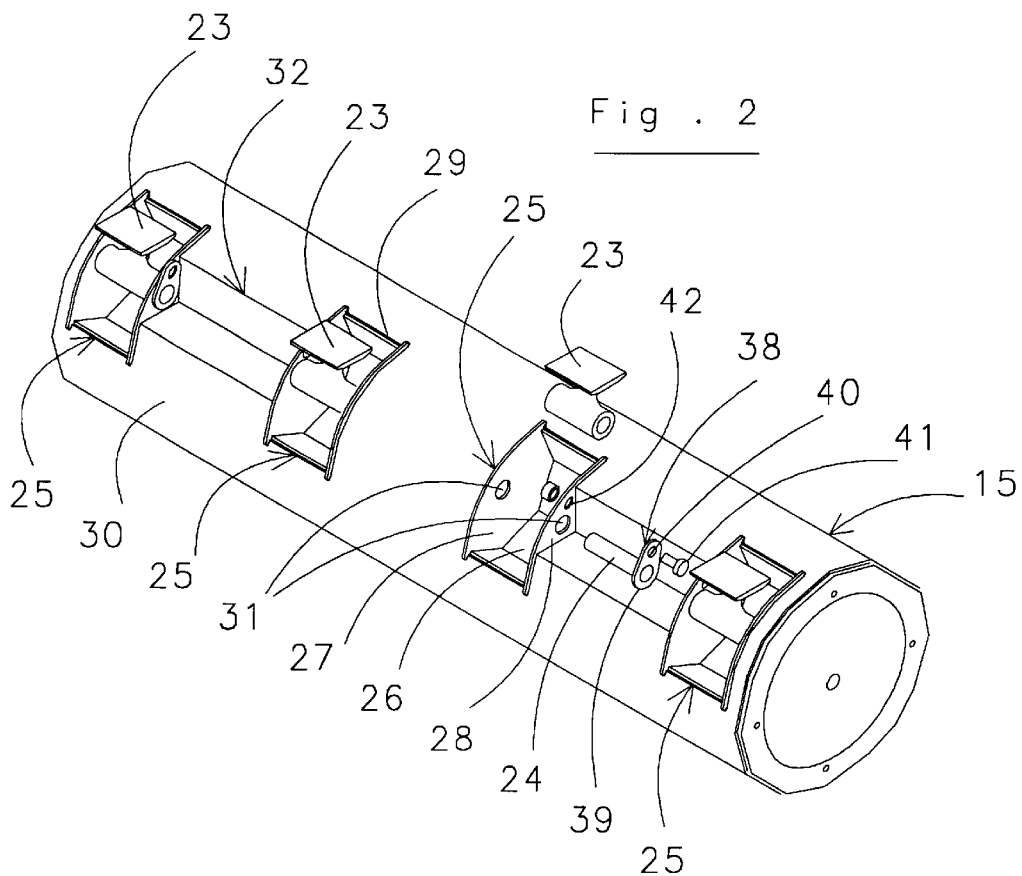
FIG. 2 depicts the cutting rotor on a larger scale.
Figure 3:
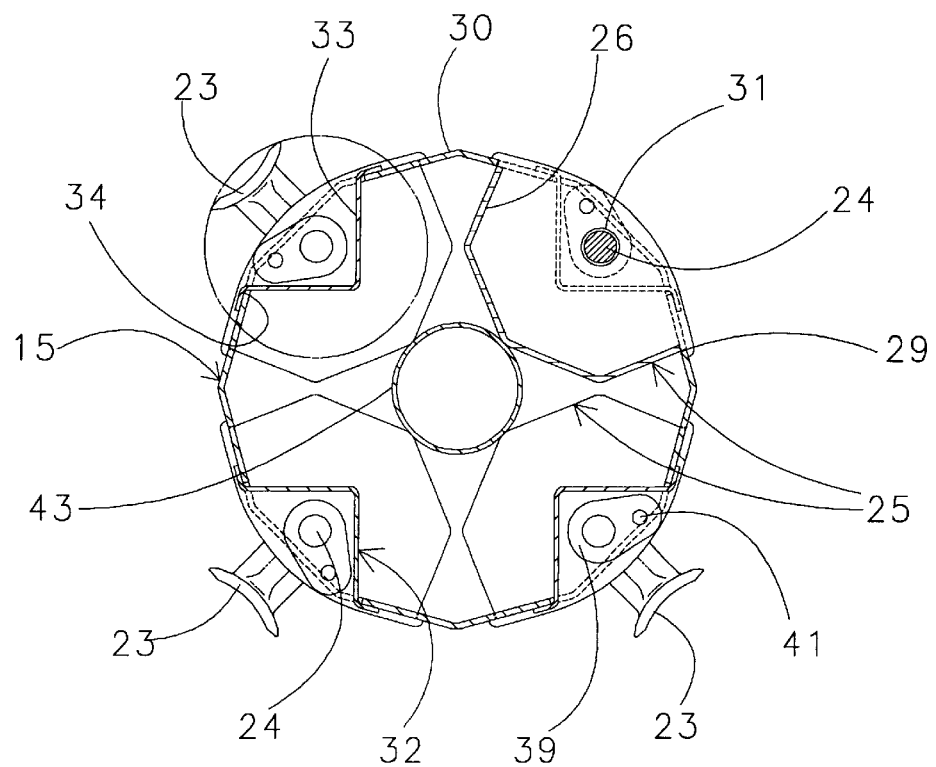
FIG. 3 depicts a section through the rotor.

As is apparent from FIGS. 2 and 3 in particular, the rotor 15 is in the form of a tube with a large cylindrical or polygonal cross section. It is equipped with knives 23 or flails which are arranged in a staggered configuration at its periphery. Each of these knives 23 is mounted on an individual axis 24 so that it can rotate about it. This axis 24 is located in a pocket 25 set back toward the inside with respect to the outer periphery of the rotor 15. Each pocket 25 consists of a shell 26 and of side walls 27 and 28. These shells 26 and side walls 27 and 28 are housed in openings 29 provided in the wall 30 of the rotor 15 and are fixed to said wall. They thus isolate the inner volume of the rotor 15 from the outside.

The side walls 27 and 28 of the pockets 25 have orifices 31 on their parts situated inside with respect to the outer periphery of the rotor 15, in which the axes 24 of the knives 23 are mounted. The rear parts of these knives 23 thus lie in the pockets 25 and are protected by the wall 30 of the rotor 15.

On at least one side of each pocket 25, the rotor 15 has a concave recess or depression 32. The bottom of this recess 32 lies slightly set back toward the inside with respect to the orifices 31 provided in the side walls 27 and 28 of the pockets 25. It thus allows access to the axis 24 from the outside so that the corresponding knife 23 can be fitted and removed. In the example according to FIG. 3, each recess 32 consists of a pressed part 33 with a V-shaped profile. This pressed part is fixed in an opening 34 provided in the wall 30 of the rotor 15. Said fixing may be achieved for example by screwing or by welding. Each recess 32 advantageously extends between two adjacent pockets 25. This arrangement allows the axes of articulation 24 of two adjacent knives 23 to be fitted and removed using the same recess 32.

Figure 4:
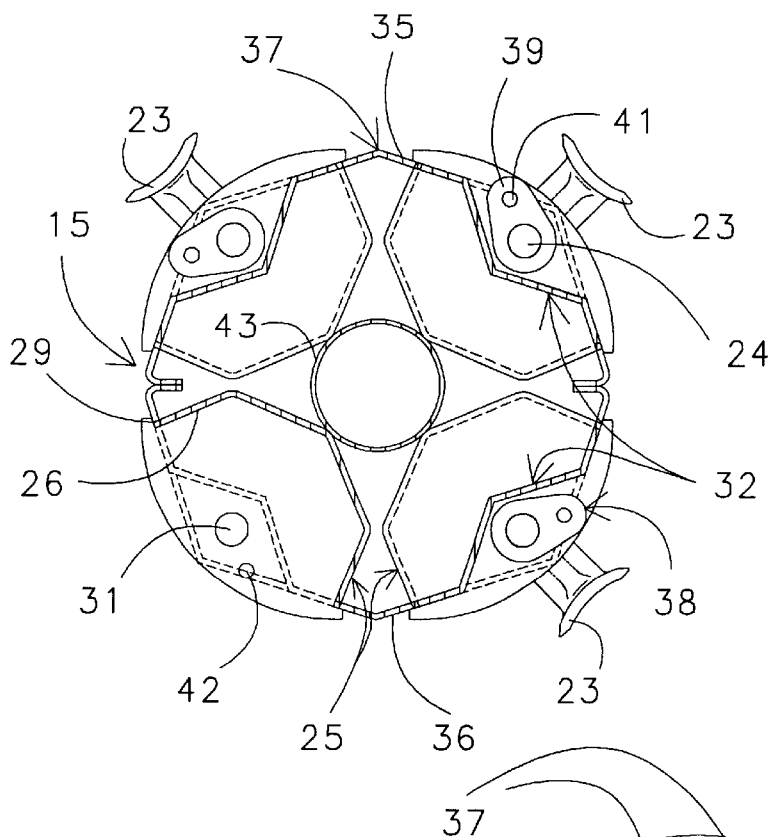
FIG. 4 depicts a section through a rotor according to another embodiment.
Figure 5:
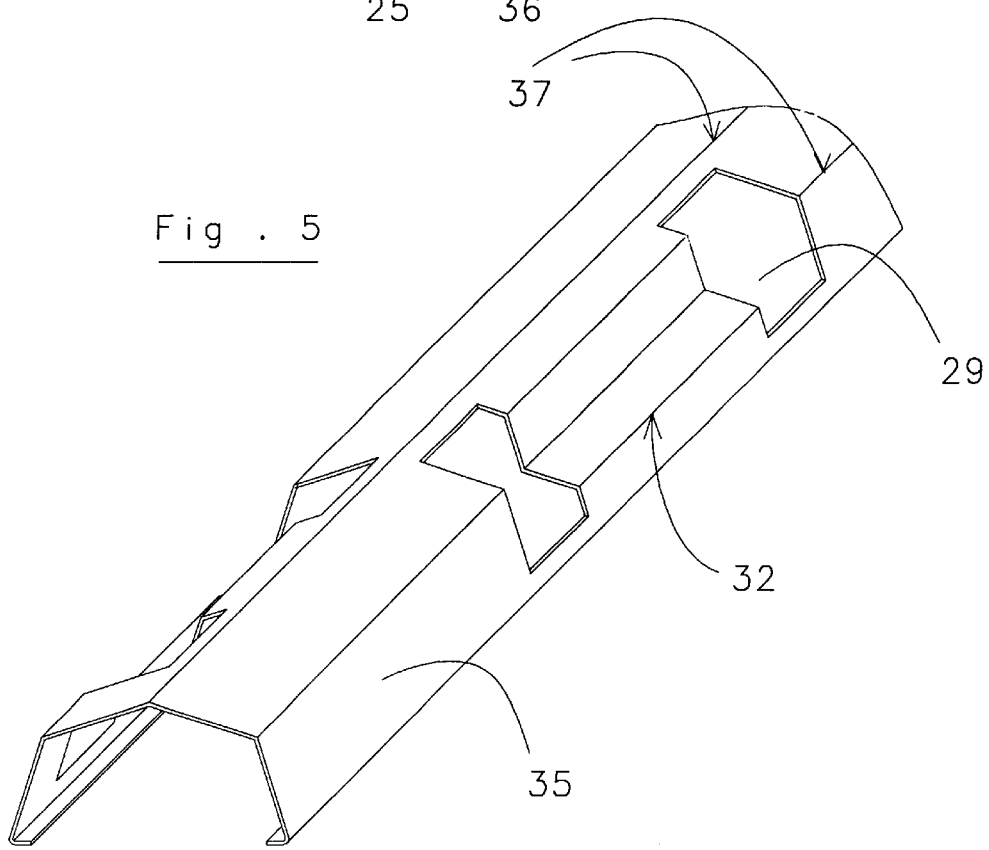
FIG. 5 depicts a part view of the rotor of FIG. 4.

The concave recesses 32 may also be obtained by pressing the wall 30 of the rotor 15. This embodiment is depicted in FIGS. 4 and 5. In this case, the rotor 15 can be made in two parts 35 and 36 obtained by pressing. These two parts 35 and 36 are substantially identical and are assembled so as to form a tube. Each one consists of a plate with openings 29 for the pockets 25, convex pressings 37 forming the outer periphery of the rotor 15 and concave pressings constituting the aforementioned recesses 32.

Each axis 24 serving to articulate a knife 23 comprises a means 38 of fixing to a side wall 27 or 28 of the corresponding pocket 25. This fixing means 38 consists of a shoulder 39 at one of the ends of the axis 24. This shoulder 39 may be welded to the axis 24. It has a hole 40 for the passage of a fixing member 41 such as a screw or a bolt. Said side wall 27 or 28 of the pocket 25 also has a hole 42 for the passage of this fixing member 41. That makes it possible for the shoulder 39 to be secured to the wall 27 or 28 of the pocket 25 and therefore for the axis 24 to be immobilized in this pocket 25.

In the examples according to FIGS. 3 and 4, a tube 43 of smaller cross section is housed in the rotor 15 in order to improve its strength. This tube 43 may advantageously be cylindrical. The pockets 25 of the rotor 15 may be connected to this tube 43. For this purpose, the rear ends of the shells 26 come into contact with the tube 43 and are screwed or welded thereto.

During work, the cutting mechanism 13 can be moved further away from or brought closer to the tractor 2 and may be shifted heightwise by means of the parts 7 and 8 which make up the arm 6. These parts 7 and 8 can themselves be moved about their axes of articulation 9 and 11 using the first hydraulic ram 10 and the second hydraulic ram 12. The third hydraulic ram 20 allows the cutting mechanism 13 to be orientated about its axis of articulation 14. The rotor 15 of the cutting mechanism 13 is then driven in rotation by the hydraulic motor 16. To cut shrub or bushes at ground level, the mechanism 13 glides along the surface of the ground by means of the skids 18 and 19. The knives 23 adopt a substantially radial position under the effect of centrifugal force. Only their cutting ends protrude beyond the periphery of the rotor 15. Thanks to its large cross section, the rotor 15 has a high inertia during work. It also perfectly discharges the cut products. The recesses 32, 37 increase the blowing effect which is beneficial in the mowing of grass. No stems become jammed around the knives 23 or their axes 24.

If an obstacle is encountered, the knives 23 can retract about their axes of articulation 24 to avoid excessively violent impacts. Said axes 24 are perfectly protected by the wall 30 or 35, 36 of the rotor 15 and are not exposed to impacts. The rotor 15 can also easily pass over obstacles since it does not have any great roughnesses on its periphery. The risk of damage to the machine is thus considerably reduced.

Moreover, each knife 23 of the rotor 15 which has become worn through work is easily replaced. All that is required is for the fixing member 41 to be unscrewed in order to release the corresponding axis of articulation 24. The latter can then be withdrawn from the pocket 25 by passing it through the adjacent concave recess 32. A new knife 23 can then be fitted and the axis 24 can once again be fixed to the side wall 27 or 28 of the pocket 25.

For transport, the inner part 7 of the arm 6 can be oriented upward using the first hydraulic ram 10, and the second part 8 can be folded down about its axis 11 using the second hydraulic ram 12. The overall bulk of the assembly is then reduced.

Quite obviously, the invention is not restricted to the embodiments described hereinabove and depicted in the appended drawings. Modifications remain possible, particularly as regards the construction or number of the various elements or by substituting technical equivalents, without in any way departing from the field of protection.

What is claimed as new and desired to be secured by Letters Patent of the United States is:

1. Cutting machine comprising a frame which can be hitched to a tractor and carries a cutting mechanism comprising a large cross section rotor having an outer periphery and knives which are mounted on axes arranged in pockets provided in said rotor, wherein each knife is mounted on an individual axis located in a pocket so as to be situated inside said outer periphery of the rotor and wherein this rotor, on at least one side of each pocket, has a concave recess for fitting and removing the corresponding axis.

2. Machine as claimed in claim 1, wherein the bottom of the concave recesses lies slightly set back toward the inside with respect to the axis of the knife which is mounted in the corresponding pocket.

3. Machine as claimed in claim 2, wherein the concave recesses extend between two adjacent pockets.

4. Machine as claimed in claim 2, wherein the concave recesses have a V-shaped profile.

5. Machine as claimed in claim 1, wherein each concave recess consists of a pressed part which is housed in an opening in the wall of the rotor.

6. Machine as claimed in claim 1, wherein the concave recesses are made by pressing the wall of the rotor.

7. Machine as claimed in claim 1, wherein the rotor is made in two parts which are assembled in order to form a tube.

8. Machine as claimed in claim 7, wherein each part has cutouts for fixing the pockets, concave pressings constituting the recesses and convex pressings forming the outer periphery of the rotor.

9. Machine as claimed in claim 1, wherein each axis has a means of fixing to a side wall of the corresponding pocket.

10. Machine as claimed in claim 9, wherein the fixing means consists of a shoulder at one of the ends of the axis, which shoulder has a hole for the passage of a fixing member.

11. Machine as claimed in claim 1, wherein a tube of smaller cross section is housed in the rotor and wherein the pockets are connected to this tube.

12. Machine as claimed in claim 11, wherein the pockets are fixed to the tube.

13. Machine as claimed in claim 2, wherein each concave recess extends between two adjacent pockets, has a V-shaped profile and consists of a pressed part which is housed in an opening in the wall of the rotor.

14. Machine as claimed in claim 2, wherein the concave recesses extend between two adjacent pockets, have a V-shaped profile and are made by pressing the wall of the rotor.

* * * * *